US005610840A

United States Patent [19]

Yamamoto et al.

[11] Patent Number: 5,610,840

[45] Date of Patent: Mar. 11, 1997

[54] SIGNAL PROCESSING DEVICE

[75] Inventors: Yasuhiro Yamamoto; Koichi Sato, both of Tokyo, Japan

[73] Assignee: Asahi Kogaku Kogyo Kabushiki Kaisha, Tokyo, Japan

[21] Appl. No.: 294,585

[22] Filed: Aug. 23, 1994

[30] Foreign Application Priority Data

Sep. 2, 1993 [JP] Japan .................................. 5-240276

[51] Int. Cl.[6] .................................................. H04N 7/15

[52] U.S. Cl. ...................................... 364/514 R; 348/476

[58] Field of Search ................................... 348/441, 572, 348/691, 185, 695, 648, 679, 476, 478; 345/1, 10, 13, 77; 364/514 R

[56] References Cited

U.S. PATENT DOCUMENTS

| | | | |
|---|---|---|---|
| 3,705,260 | 12/1972 | Okada | 348/647 |
| 3,927,255 | 12/1975 | Yorkanis | 348/695 |
| 4,298,885 | 11/1981 | Okada | 348/679 |
| 4,729,026 | 3/1988 | Suzuki et al. | 348/572 |
| 5,153,740 | 10/1992 | Sato . | |
| 5,334,998 | 8/1994 | Priem et al. | 345/185 |

*Primary Examiner*—Ellis B. Ramirez
*Assistant Examiner*—Thomas Peeso
*Attorney, Agent, or Firm*—Greenblum & Bernstein P.L.C.

[57] ABSTRACT

A signal processing device has a memory in which a digital image signal is stored, and a data bus including a plurality of signal liens is connected to the memory. A pull-up resistance is connected to a predetermined signal line, and the other signal lines are connected to the ground through pull-down resistances. A blanking signal $\overline{BLK3}$ at a low level is inputted into an output enable terminal of the memory, so that the output terminal of the memory becomes high-impedance, and thus a digital signal corresponding to a pedestal level is outputted through the data bus and a blanking period is formed. The pedestal level is determined by the position of the pull-up resistance.

20 Claims, 3 Drawing Sheets

Y+S
SYNC. AND CLOCK GEN. CIRCUIT
22
fs1
BLK4
R-Y
B-Y
A/D
23
24
25
CLK
EN
BLK3
BLK1
MEMORY CONTROL CIRCUIT
29
(SYNC, BLK2, fs2)
Y-MEMORY
26
R-MEMORY
27
B-MEMORY
28
ADDR
TERMINATOR
41
42
43
D/A
31
32
33
SYNC. GENERATING CIRCUIT
34
SYNC
fs2
BLK2
39
SYSTEM CONTROL CIRCUIT
20
OPERATION UNIT
21

SIGNAL PROCESSING DEVICE

BACKGROUND OF THE INVENTION

1. Field of the Invention

The present invention relates to a signal processing device in which an image signal is temporarily stored in a memory and a blanking period is added to the image signal when the image signal is outputted from the memory to allow the image signal to be recorded on or reproduced from a recording medium such as a magnetic disk.

2. Description of the Related Art

In a conventional still video device, when an image signal is recorded on a recording medium such as a magnetic disk, or when an image signal recorded on a recording medium is reproduced, the image signal is converted to a digital signal and temporarily stored in a memory. A horizontal blanking period signal and a vertical blanking period signal are not stored in the memory. Therefore, when the image signal stored in the memory is read from the memory and converted to an analog image signal, a horizontal blanking period signal and a vertical blanking period signal are added to the image signal, and a pedestal level is formed during the blanking periods.

To add the pedestal level to the image signal, an AND circuit is provided between the memory and a D/A converter. Namely, a signal outputted from the memory is prevented from being transmitted to the D/A converter by an operation of the AND circuit, so that a blanking period is formed.

Thus, in the conventional still video device, an AND circuit is provided for forming the blanking period, and therefore, the still video device has a bulky and complex construction.

SUMMARY OF THE INVENTION

Therefore, the present invention provides a signal processing device in which a specific circuit is not provided for forming horizontal and vertical blanking periods and setting a pedestal level, and this allows the still video device to have a compact and simple construction.

According to the present invention, there is provided a signal processing device which includes a memory, a resistor and control means. A digital image signal is stored in the memory. The memory is connected to a data bus. The resistor is connected to the data bus. The control means controls an operation in which the image signal is outputted through the data bus from the memory. The control means stops an output of the image signal so that a blanking period is formed. The resistor is constructed in such a manner that a pedestal level is outputted from the data bus when the blanking period is formed.

Further, according to the present invention, there is provided a signal processing device which includes a memory, a data bus, at least one resistor and blanking period forming means. A digital still image signal is stored in the memory. The data bus is connected to the memory and has a plurality of signal lines. At least one resistor is connected to the signal lines. The blanking period forming means forms a blanking period when a signal is outputted through the data bus from the memory. The blanking period forming means stops the output of the image signal so that said blanking period is formed. The blanking period has a signal level determined in accordance with the signal lines to which the resistor is connected.

Furthermore, according to the present invention, there is provided a signal processing device having a memory in which a digital image signal is stored, the device includes a data bus, control means and a resistor. The data bus is connected to the memory and has a plurality of signal lines. The control means controls an output of the image signal through the data bus from the memory. The resistor is connected to the signal lines in such a manner that a pedestal level signal is outputted through the data bus when the control means stops the output of the image signal.

Further, according to the present invention, there is provided a signal processing device which includes a memory, a data bus, a resistor and control means. A digital image signal is stored in the memory. The data bus is connected to an output terminal of the memory. The resistor is connected to the data bus. The control means controls an output to the data bus in accordance with a control signal inputted to the memory, whereby the image signal is outputted the memory when the control signal has a first value, and a pedestal level signal is placed on the data bus when the control signal has a second value different from the first value.

BRIEF DESCRIPTION OF THE DRAWINGS

The present invention will be better understood from the description of the preferred embodiments of the invention set forth below and from the accompanying drawings in which.

DESCRIPTION OF THE PREFERRED EMBODIMENTS

Figure 1:
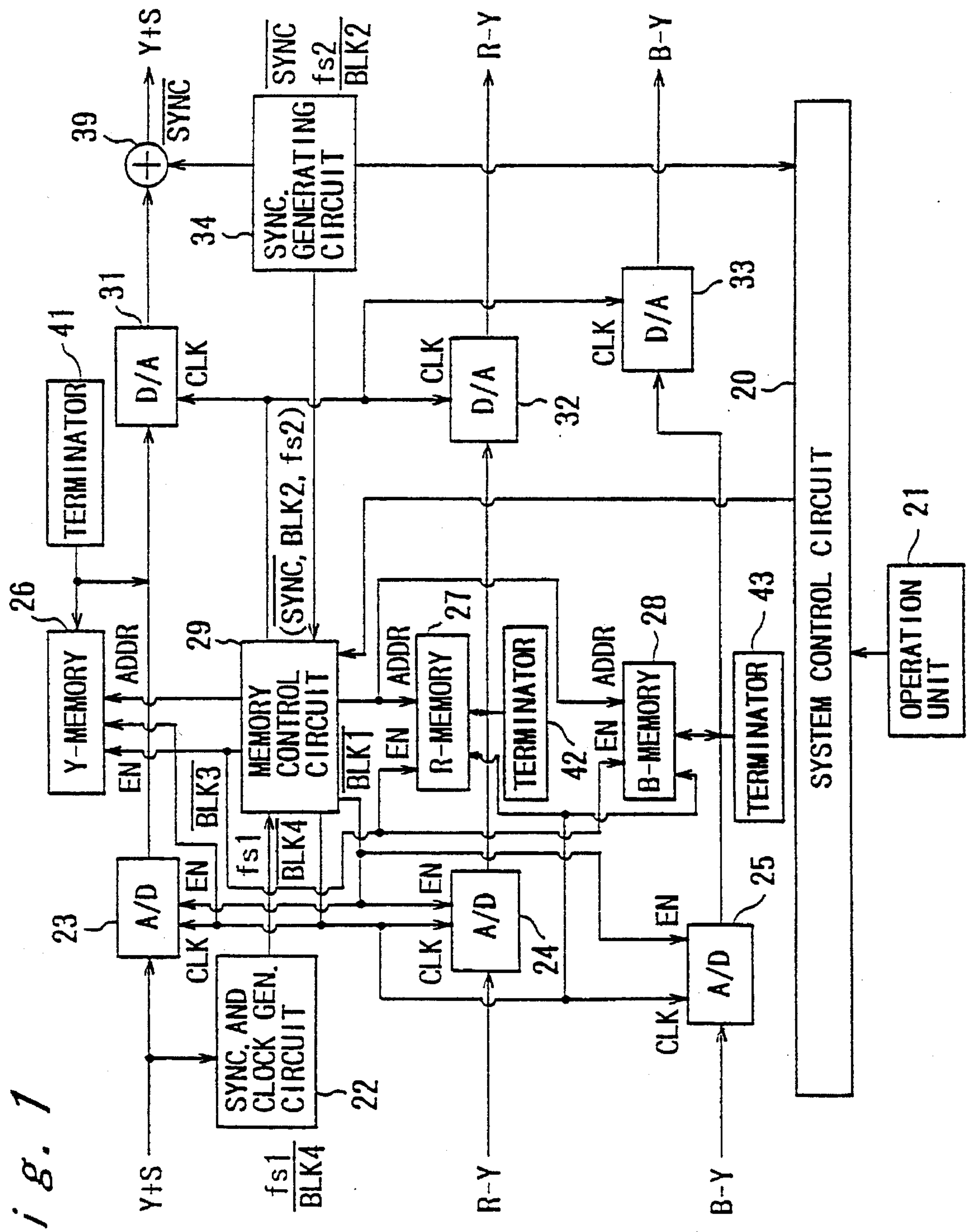
FIG. 1 is a block diagram of a signal processing device of an embodiment of the present invention.

The present invention will now be described with reference to an embodiment shown in the drawings.

FIG. 1 is a block diagram showing a signal processing device of an embodiment of the present invention. The signal processing device is included in a still video device.

A system control circuit 20 is a microcomputer and it controls the signal processing device as a whole. An operation unit 21 is connected to the system control circuit 20, and a process such as recording an image signal is carried out by operating the operation unit 21.

A luminance signal (Y+S) and differential color signals (R–Y, B–Y) generated according to the NTSC system, for example, are inputted to this signal processing device through an input-output terminal not shown. The luminance signal (Y+S) is inputted into an A/D converter 23 and a synchronizing signal separating and clock generating circuit 22. The luminance signal (Y+S) is converted to a digital signal by the A/D converter 23, and outputted to a Y-memory 26 and a D/A converter 31. The differential color signal (R–Y) is inputted into an A/D converter 24, converted to a digital signal, and outputted to an R-memory 27 and a D/A converter 32. The differential color signal (B–Y) is inputted into an A/D converter 25, and converted to a digital signal, and outputted to a B-memory 28 and a D/A converter 33.

In the synchronizing signal separating and clock generating circuit 22, a synchronizing signal is separated from the luminance signal (Y+S), so that a clock signal $f_{S1}$ and a blanking signal $\overline{BLK4}$ are generated and outputted to a memory control circuit 29 and the system control circuit 20.

In the memory control circuit 29, a clock signal CLK and an address signal ADDR are generated based on the clock signal $f_{S1}$ and the blanking signal $\overline{BLK4}$. The clock signal CLK is inputted to the A/D converters 23, 24 and 25, and the memories 26, 27 and 28, so that the A/D conversion in the A/D converters 23, 24 and 25 and the data write timing to the memories 26, 27 and 28 are controlled. The address signal ADDR is inputted to the memories 26, 27 and 28, so that the write-address for the memories 26, 27 and 28 is controlled. Further, in the memory control circuit 29, a blanking signal $\overline{BLK1}$ is generated based on the blanking signal $\overline{BLK4}$, and inputted to output enable terminals of the A/D converters 23, 24 and 25.

The luminance signal and the differential color signals stored in the Y-memory 26, and the R-memory 27 and the B-memory 28 respectively, are read out from these memories 26, 27 and 28 and converted to analog signals by D/A converters 31, 32 and 33. As described later, in an operation in which the luminance signal and the differential color signals are read from the memories 26, 27 and 28 and inputted into the D/A converters 31, 32 and 33, a blanking period is formed between each of horizontal scanning lines. The reading of the luminance signal and the differential color signals from the memories 26, 27 and 28 and the D/A conversion is controlled by the memory control circuit 29.

The luminance signal read from the Y-memory 26 is converted to an analog signal by the D/A converter 31, and inputted into an address 39, in which a synchronizing signal $\overline{SYNC}$, generated in a synchronizing signal generating circuit 34, is added to the luminance signal; the combined signal is outputted to a magnetic disk recording device (not shown) or a display device (not shown). The differential color signal read from the R-memory 27 is converted to an analog signal by the D/A converter 32, and outputted to the magnetic disk recording device. Similarly, the differential color signal read from the B-memory 28 is converted to an analog signal by the D/A converter 33, and outputted to the magnetic disk recording device.

In the synchronizing signal generating circuit 34, in addition to the synchronizing signal $\overline{SYNC}$, a blanking signal $\overline{BLK2}$ and a clock signal $f_{S2}$ are generated. The blanking signal $\overline{BLK2}$ and the clock signal $f_{S2}$ are inputted into the memory control circuit 29 and a blanking signal $\overline{BLK3}$ is generated in the memory control circuit 29 based on the blanking signal $\overline{BLK2}$. The blanking signal $\overline{BLK3}$ is inputted into output enable terminals of the memories 26, 27 and 28. Further, in the memory control circuit 29, a clock signal CLK and a address signal ADDR are generated based on the clock signal $f_{S2}$. The address signal ADDR is inputted into the memories 26, 27 and 28, so that the read address of each of the memories is controlled. The clock signal CLK is inputted into the D/A converters 31, 32 and 33, so that the timing of the D/A conversion is controlled.

Figure 2:
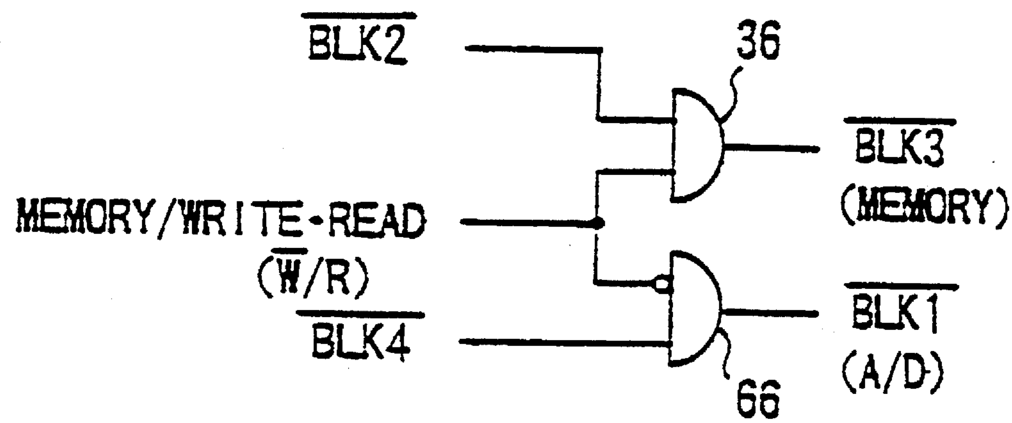
FIG. 2 is a block diagram showing a logic circuit in which the blanking signals $\overline{BLK1}$ and $\overline{BLK3}$ are generated.

FIG. 2 is a block diagram showing a logic circuit in which the blanking signals $\overline{BLK1}$ and $\overline{BLK3}$ are generated in the memory control circuit 29. As can be understood from the drawing, the blanking signal $\overline{BLK2}$ outputted from the synchronizing signal generating circuit 34 and a memory $\overline{write}$/read switching signal outputted from the system control circuit 20 are inputted into an AND circuit 36, in which a logical sum is obtained. The blanking signal $\overline{BLK4}$ outputted from the synchronizing signal separating and clock generating circuit 22 and the memory $\overline{write}$/read switching signal are inputted into an AND circuit 66, in which a logical sum is obtained. The memory $\overline{write}$/read switching signal at a low level is a command signal by which data is written into the memories, and the memory $\overline{write}$/read switching signal at a high level is a command signal by which data is read from the memories. An output signal from the AND circuit 66 is inputted into the A/D converters 23, 24 and 25 as the blanking signal $\overline{BLK1}$, and an output signal from the AND circuit 36 is inputted into the memories 26, 27 and 28 as the blanking signal $\overline{BLK3}$.

Referring to FIG. 1, terminators 41, 42 and 43 are connected to the Y-memory 26, the R-memory 27 and the B-memory 28, respectively. As described later, these terminators 41, 42 and 43 are provided to set a pedestal level when a horizontal blanking period and a vertical blanking period are added to a digital image signal outputted from the memories 26, 27 and 28.

Figure 3:
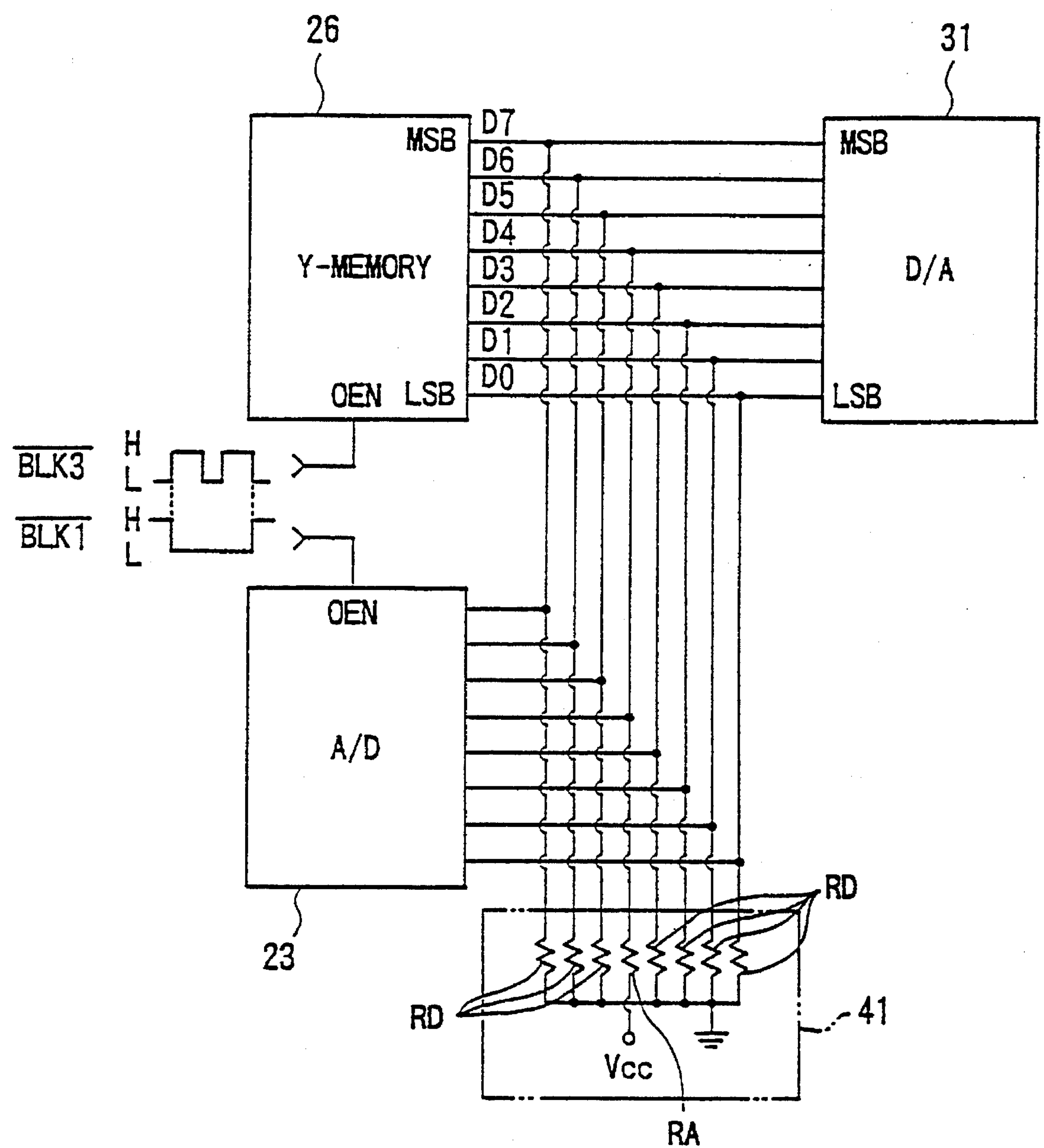
FIG. 3 shows a construction of a terminator connected to a Y-memory.

FIG. 3 shows a construction of the terminator 41 connected to the Y-memory 26. As shown in this drawing, the data bus between the memory 26 and the A/D converter 23 is composed of 8 signal lines. These signal lines are connected to input terminals of the D/A converter 31. Each of the signal lines of the memory 26 is connected to the corresponding signal lines of the A/D converter 23.

In the data bus for the Y-memory 26, a signal line D4 corresponding to the fifth bit counted from the bottommost bit is connected to a power supply Vcc through a pull-up resistance RA, and each of the other signal lines is connected to the ground through a pull-down resistance RD. Namely, the pull-up resistance RA is connected to the signal line D4, and the pull-down resistances RD are connected to the signal lines D0, D1, D2, D3, D5, D6 and D7. Each of the signal lines of the A/D converter 23 is connected to the ground through the pull-down resistances RD, except the signal line corresponding to the pull-up resistance RA.

The pull-up resistance RA and the pull-down resistances RD have values such that the image signal is not disturbed when the image signal (the luminance signal) is outputted from the memory 26. The resistance value of the pull-up resistance RA is 100 KΩ and the resistance value of each of the pull-down resistances RD is 10 KΩ.

The blanking signal $\overline{BLK3}$ outputted from the memory control circuit 29 is inputted into the output enable terminal of the Y-memory 26. When the blanking signal $\overline{BLK3}$ is at a high level, the image signal stored in the Y-memory 26 is read out, and when the blanking signal $\overline{BLK3}$ is a low level, the output terminal of the Y-memory 26 is set to a high-impedance or disconnected. On the other hand, the blanking signal $\overline{BLK1}$ outputted from the memory control circuit 29 is inputted into the output enable terminal of the A/D converter 23. When the blanking signal $\overline{BLK1}$ is a high level, the image signal is A/D converted by the A/D converter 23, and when the blanking signal $\overline{BLK1}$ is a low level, the output terminal of the A/D converter 23 is set to a high-impedance or disconnected.

When both of the blanking signals $\overline{BLK1}$ and $\overline{BLK3}$ are low level, only the signal line D4 becomes "H" (high level), since all of the output terminals of the Y-memory 26 and the A/D converter 23, except the signal line D4, become high-impedance and the lines are connected to the ground through the resistances RD. Accordingly, data representing a level of 16/255 (00010000) is inputted into the D/A converter 31. This data is a pedestal level which is obtained by quantizing a luminance signal with 8 bits as suggested in the Rec-601 recommendation of the CCIR (Consulting Committee of International Radiocommunications). Namely, the resistances RA and RD are connected to the data bus in such a manner that the pedestal level is outputted from the data bus when a blanking period is formed.

Each of the terminator 42 connected to the R-memory 27 and the terminator 43 connected to the B-memory 28 has the same construction as the terminator 41. In each of the terminators 42 and 43, however, a pull-up resistance is connected to a signal line D7 corresponding to the topmost bit, and not to a signal line D4 corresponding to the fifth bit from the bottommost.

The operation of the embodiment is described below.

In the synchronizing signal separating and clock generating circuit 22, a synchronizing signal included in the luminance signal (Y+S) is separated therefrom, so that a clock signal $f_{S1}$ having a phase coincident with that of the synchronizing signal is generated. This clock signal $f_{S1}$ is inputted into the memory control circuit 29, and a clock signal CLK and an address signal ADDR are generated in the memory control circuit 29. The clock signal CLK is inputted into the A/D converters 23, 24 and 25 and the memories 26, 27 and 28. In the A/D converters 23, 24 and 25, the luminance signal and the differential color signals (R−Y, B−Y) are converted to digital signals in accordance with the clock signal CLK. Then, the luminance signal and the differential color signals are inputted into the Y-memory 26, the R-memory 27 and the B-memory 28, and are stored in predetermined addresses in the memories in accordance with the address signal ADDR. When the signals are stored in the memories, the memory $\overline{\text{write}}$/read switching signal at a low level (i.e., a writing command) is inputted into the memory control circuit 29. Therefore, at this time, the blanking signal $\overline{\text{BLK1}}$ is at a high level and the blanking signal $\overline{\text{BLK3}}$ is kept at a low level in synchronization with the memory $\overline{\text{write}}$/read switching signal at a low level during the input of horizontal scanning lines.

When image signals corresponding to one frame or one field have been stored in each of the Y-memory 26, the R-memory 27 and the B-memory 28, a signal indicating the completion of storing the image signal is outputted from the memory control circuit 29 to the system control circuit 20. In accordance with the completion signal, a command signal for reading out the image signal from each of the memories 26, 27 and 28 (i.e., the memory $\overline{\text{write}}$/read switching signal at a high level) is outputted from the system control circuit 20 to the memory control circuit 29 so that the image signal stored in each of the memories can be recorded on a magnetic disk, for example.

In accordance with the command signal for reading out the image signal, the memory control circuit 29 changes the blanking signal $\overline{\text{BLK1}}$ to a low level, sets the blanking signal $\overline{\text{BLK3}}$ to a high level, and, in synchronization with the clock signal $f_{S2}$, the memory control circuit 29 generates the address signal ADDR and the clock signal CLK and outputs them to the memories 26, 27 and 28 and the D/A converters 31, 32 and 33. As a result, one horizontal scanning line of an image signal is read out from each of the memories 26, 27 and 28, and outputted through the data bus from the memories to the D/A converters 31, 32 and 33. The image signal is converted to an analog signal by the D/A converter 31, 32 and 33 and then transmitted to the magnetic disk.

When the output of the horizontal scanning line is completed, i.e., when the blanking period is started, the blanking signal $\overline{\text{BLK2}}$ is set to a low level. Accordingly, the memory control circuit 29 sets the blanking signal $\overline{\text{BLK3}}$ to a low level, and thus, a pedestal level signal generated in the data bus is inputted to the D/A converters 31, 32 and 33. The pedestal level signal is converted to an analog signal by the D/A converters 31, 32 and 33, and then outputted to the magnetic disk.

When the blanking period is finished, the memory control circuit 29 sets the blanking signal $\overline{\text{BLK3}}$ again to a high level, and generates the address signal ADDR and the clock signal CLK. The address signal ADDR is outputted to each of the memories 26, 27 and 28 and the clock signal CLK is outputted to each of the D/A converters 31, 32 and 33, so that the next horizontal scanning line is read out from each of the memories 26, 27 and 28, converted to an analog signal by the D/A converters 31, 32 and 33, and outputted to the magnetic disk.

By repeating such an operation, a horizontal or vertical blanking period is formed between each of horizontal scanning lines, so that image signals for one field or one frame can be recorded on a magnetic disk.

Figure 4:
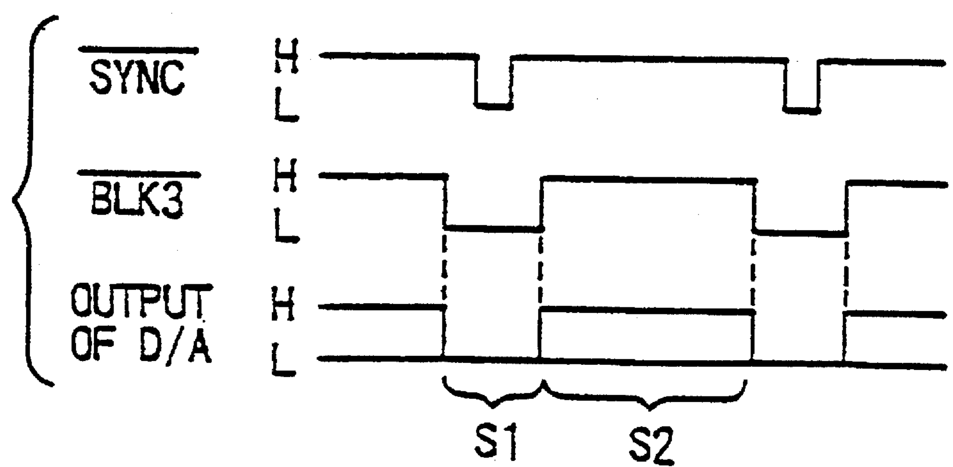
FIG. 4 shows a luminance signal outputted from a D/A converter and a synchronizing signal $\overline{SYNC}$ outputted from a synchronizing signal generating circuit.

FIG. 4 shows a luminance signal outputted from the D/A converter 31 and a synchronizing signal $\overline{\text{SYNC}}$ outputted from the synchronizing signal generating circuit 34. As can be understood from this drawing, the blanking period S1 is coincident with the period when the blanking signal $\overline{\text{BLK3}}$ is set to a low level. In the blanking period S1, the level state of the data bus, i.e., a pedestal level signal, is D/A converted by the D/A converter 31 (FIG. 1). In the image signal effective period S2, the image data outputted from the Y-memory 26 is D/A converted. Note that, in the blanking period S1, the synchronizing signal $\overline{\text{SYNC}}$ is added to the pedestal level signal.

As described above, according to the embodiment, it is not necessary to provide a specific circuit for forming the pedestal level signal of the blanking period, and therefore, the circuit of the still video device can be simplified.

Note that the present invention can be used as a device by which a signal format is transformed to another format when an image signal of the NTSC system, the PAL system or the High Vision system is recorded on a recording medium. Further, the present invention can be used as a device in which, when one still image frame is outputted by a display device in a video tape recorder or an optical disc device recording a moving image, one frame of an image signal can be read out from the recording medium, stored in an memory and shown on a display device.

Although the embodiment of the present invention have been described herein with reference to the accompanying drawings, obviously many modifications and changes may be made by those skilled in this art without departing from the scope of the invention.

The present disclosure relates to subject matter contained in Japanese Patent Application No. 5-240276 (filed on Sep. 2, 1993) which is expressly incorporated herein, by reference, in its entirety.

We claim:

1. A signal processing device, comprising:

a memory in which a digital image signal is stored, said memory being connected to a data bus;

a resistor connected to said data bus; and means for controlling an operation in which said digital image signal is outputted through said data bus from said memory, said controlling means performing said operation, and stopping said operation so that a blanking period is formed;

said resistor being constructed in such a manner that a pedestal level is outputted from said data bus when said blanking period is formed.

2. A device according to claim 1, said resistor having a resistor value such that said digital image signal is not disturbed when said digital image signal is outputted from said memory.

3. A device according to claim 1, said data bus having a plurality of signal lines connected to a D/A converter, and said resistor being connected to one of said signal lines.

4. A device according to claim 3, said resistor comprising a pull-up resistance.

5. A device according to claim 4, each of said plurality of signal lines being connected to the ground through a pull-down resistance, except a predetermined signal line corresponding to said pull-up resistance.

6. A device according to claim 3, a pull-up resistance being connected to a predetermined signal line included in said data bus, said predetermined signal line corresponding to a bit showing a digital value of said pedestal level.

7. The signal processing device of claim 3, said resistor connected to a power supply and a voltage across said resistor representative of said pedestal level.

8. The signal processing device of claim 3, said one of said signal lines corresponding to a predetermined input of said D/A converter such that said D/A converter outputs said pedestal level.

9. The signal processing device of claim 1, said controlling means outputting a first control signal so that said digital image signal is outputted through said data bus from said memory, and said controlling means outputting a second control signal when said output terminal of said memory is set to a high impedance.

10. A signal processing device, comprising:

a memory in which a digital still image signal is stored;

a data bus connected to said memory and having a plurality of signal lines;

at least one resistor connected to said signal lines; and means for forming a blanking period when a signal is outputted through said data bus from said memory, said forming means stopping an operation of outputting said digital image signal to form said blanking period, said blanking period having a signal level determined in accordance with said signal lines to which said at least one resistor is connected.

11. A signal processing device having a memory in which a digital image signal is stored, said device comprising:

a data bus connected to said memory and having a plurality of signal lines;

means for controlling an operation in which said digital image signal is outputted through said data bus from said memory, said controlling means performing said operation, and stopping said operation so that a blanking period is formed; and a resistor connected to said signal lines in such a manner that a pedestal level signal is outputted through said data bus when said controlling means stops output of said digital image signal.

12. A device according to claim 11, said resistor comprising pull-up resistance connected to at least one signal line of said data bus, and at least one pull-down resistance connected to each of the other signal lines of said data bus, said pull-up resistance being connected to a power supply circuit, said pull-down resistance being connected to the ground.

13. The signal processing device of claim 11, said controlling means outputting a first control signal so that said digital image signal is outputted through said data bus from said memory, and said controlling means outputting a second control signal when said output terminal of said memory is set to a high impedance.

14. The signal processing device of claim 11, said one of said signal lines corresponding to a predetermined input of said D/A converter such that said D/A converter outputs said pedestal level.

15. A signal processing device, comprising:

a memory in which a digital image signal is stored;

a data bus connected to an output terminal of said memory;

a resistor connected to said data bus; and means for controlling an operation in which said digital image signal is outputted through said data bus from said memory in accordance with a control signal inputted to said memory, wherein said digital image signal is outputted from said memory when said control signal has a first value, and said operation is stopped and a pedestal level signal is placed on said data bus when said control signal has a second value different from said first value.

16. A device according to claim 15, said control signal being outputted by a synchronizing signal generating circuit provided for generating an image signal, said control means setting an output terminal of said memory to a high-impedance when said control signal has said second value.

17. The signal processing device of claim 15, said resistor connected to a power supply and a voltage across said resistor representative of said pedestal level.

18. The signal processing device of claim 15, said data bus connected to an input terminal of a D/A converter.

19. The signal processing device of claim 15, said one of said signal lines corresponding to a predetermined input of said D/A converter such that said D/A converter outputs said pedestal level.

20. The signal processing device of claim 15, said resistor comprising a pull-up resistance connected to said data bus.

* * * * *

UNITED STATES PATENT AND TRADEMARK OFFICE

CERTIFICATE OF CORRECTION

PATENT NO. : 5,610,840

DATED : March 11, 1997

INVENTOR(S) : Y. YAMAMOTO et al.

It is certified that error appears in the above-indentified patent and that said Letters Patent is hereby corrected as shown below:

On the cover, in section [57], "ABSTRACT", line 3, change "liens" to ---lines---.

Signed and Sealed this

Seventeenth Day of June, 1997

Attest:

BRUCE LEHMAN

Attesting Officer

Commissioner of Patents and Trademarks